(12) United States Patent
Mc Kinney, Jr. et al.

(10) Patent No.: US 6,238,296 B1
(45) Date of Patent: May 29, 2001

(54) SIMULATED BOAT DEVICE

(76) Inventors: Woodrow Mc Kinney, Jr.; Gladys Mc Kinney, both of 3721 Somerset Dr., Gastonia, NC (US) 28052

( * ) Notice: Subject to any disclaimer, the term of this patent is extended or adjusted under 35 U.S.C. 154(b) by 0 days.

(21) Appl. No.: 09/428,885

(22) Filed: Oct. 28, 1999

(51) Int. Cl.[7] ..................................................... A63G 3/00
(52) U.S. Cl. ............................... 472/13; 472/14; 280/829
(58) Field of Search ................................ 472/13, 14, 21, 472/26; 280/828, 829; 114/344

(56) References Cited

U.S. PATENT DOCUMENTS

| | | |
|---|---|---|
| D. 335,697 | 5/1993 | Cleary . |
| 1,705,681 | 3/1929 | Proctor . |
| 1,995,155 * | 3/1935 | Nelson ........................ 280/829 |
| 2,144,252 | 1/1939 | Bender . |
| 2,958,535 | 11/1960 | Dupree . |
| 3,174,767 | 3/1965 | Sendoykas . |
| 3,749,399 | 7/1973 | Fedor et al. . |
| 3,913,929 * | 10/1975 | Matsuura ........................ 280/828 |
| 4,361,338 * | 11/1982 | Kuchenbecker et al. ............ 280/828 |
| 4,790,546 * | 12/1988 | Mendenhall ........................ 280/828 |

* cited by examiner

*Primary Examiner*—Kien T. Nguyen

(57) ABSTRACT

A simulated boat device for having directional control that simulates a boat rudder. The simulated boat device includes a hollow structure forming the hull of the boat device. The hollow structure has a bottom wall, a top wall, a front portion, a back portion and middle portion. The top wall has an opening therein. The hollow structure has first and second opposing side walls. A first bore is in the first wall and is located generally in the front portion of the hollow structure. A second bore is in the second wall and is generally coaxial with the first bore. An axle extends through and is rotatable mounted in the first and second bores in the hollow structure. The axle has a first end and a second end. A first wheel is fixedly coupled to the first end of the axle, and a second wheel is fixedly coupled to the second end of the axle. An opening is in the bottom wall in the back portion of the hollow structure. A third wheel is rotatably mounted in the opening in the bottom wall. The third wheel is adapted to swivel, such that an axis of the third wheel rotates with respect to the hollow structure.

9 Claims, 2 Drawing Sheets

SIMULATED BOAT DEVICE

BACKGROUND OF THE INVENTION

1. Field of the Invention

The present invention relates to boat simulating vehicles and more particularly pertains to a new simulated boat device for having directional control that simulates a boat rudder.

2. Description of the Prior Art

The use of boat simulating vehicles is known in the prior art. More specifically, boat simulating vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,958,535; U.S. Pat. No. 3,174,767; U.S. Pat. No. 1,705,681; U.S. Pat. No. 2,144,252; U.S. Pat. No. 3,749,399; and U.S. Pat. Des. No. 335,697.

While these devices fulfill their respective, particular objectives and requirements, the aforementioned patents do not disclose a new simulated boat device. The inventive device includes a hollow structure forming the hull of the boat device. The hollow structure has a bottom wall, a top wall, a front portion, a back portion and middle portion. The top wall has an opening therein. The hollow structure has first and second opposing side walls. A first bore is in the first wall and is located generally in the front portion of the hollow structure. A second bore is in the second wall and is generally coaxial with the first bore. An axle extends through and is rotatably mounted in the first and second bores in the hollow structure. The axle has a first end and a second end. A first wheel is fixedly coupled to the first end of the axle, and a second wheel is fixedly coupled to the second end of the axle. An opening is in the bottom wall in the back portion of the hollow structure. A third wheel is rotatably mounted in the opening in the bottom wall. The third wheel is adapted to swivel, such that an axis of the third wheel rotates with respect to the hollow structure.

In these respects, the simulated boat device according to the present invention substantially departs from the conventional concepts and designs of the prior art, and in so doing provides an apparatus primarily developed for the purpose of having directional control that simulates a boat rudder.

SUMMARY OF THE INVENTION

In view of the foregoing disadvantages inherent in the known types of boat simulating vehicles now present in the prior art, the present invention provides a new simulated boat device construction wherein the same can be utilized for having directional control that simulates a boat rudder.

The general purpose of the present invention, which will be described subsequently in greater detail, is to provide a new simulated boat device apparatus and method which has many of the advantages of the boat simulating vehicles mentioned heretofore and many novel features that result in a new simulated boat device which is not anticipated, rendered obvious, suggested, or even implied by any of the prior art boat simulating vehicles, either alone or in any combination thereof.

To attain this, the present invention generally comprises a hollow structure forming the hull of the boat device. The hollow structure has a bottom wall, a top wall, a front portion, a back portion and middle portion. The top wall has an opening therein. The hollow structure has first and second opposing side walls. A first bore is in the first wall and is located generally in the front portion of the hollow structure. A second bore is in the second wall and is generally coaxial with the first bore. An axle extends through and is rotatably mounted in the first and second bores in the hollow structure. The axle has a first end and a second end. A first wheel is fixedly coupled to the first end of the axle, and a second wheel is fixedly coupled to the second end of the axle. An opening is in the bottom wall in the back portion of the hollow structure. A third wheel is rotatably mounted in the opening in the bottom wall. The third wheel is adapted to swivel, such that an axis of the third wheel rotates with respect to the hollow structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new simulated boat device apparatus and method which has many of the advantages of the boat simulating vehicles mentioned heretofore and many novel features that result in a new simulated boat device which is not anticipated, rendered obvious, suggested, or even implied by any of the prior art boat simulating vehicles, either alone or in any combination thereof.

It is another object of the present invention to provide a new simulated boat device which may be easily and efficiently manufactured and marketed.

It is a further object of the present invention to provide a new simulated boat device which is of a durable and reliable construction.

An even further object of the present invention is to provide a new simulated boat device which is susceptible of a low cost of manufacture with regard to both materials and labor, and which accordingly is then susceptible of low prices of sale to the consuming public, thereby making such simulated boat device economically available to the buying public.

Still yet another object of the present invention is to provide a new simulated boat device which provides in the apparatuses and methods of the prior art some of the advantages thereof, while simultaneously overcoming some of the disadvantages normally associated therewith.

Still another object of the present invention is to provide a new simulated boat device for having directional control that simulates a boat rudder.

Yet another object of the present invention is to provide a new simulated boat device which includes a hollow structure forming the hull of the boat device. The hollow structure has a bottom wall, a top wall, a front portion, a back portion and middle portion. The top wall has an opening therein. The hollow structure has first and second opposing side walls. A first bore is in the first wall and is located generally in the front portion of the hollow structure. A second bore is in the second wall and is generally coaxial with the first bore. An axle extends through and is rotatably mounted in the first and second bores in the hollow structure. The axle has a first end and a second end. A first wheel is fixedly coupled to the first end of the axle, and a second wheel is fixedly coupled to the second end of the axle. An opening is in the bottom wall in the back portion of the hollow structure. A third wheel is rotatably mounted in the opening in the bottom wall. The third wheel is adapted to swivel, such that an axis of the third wheel rotates with respect to the hollow structure.

Still yet another object of the present invention is to provide a new simulated boat device that has an adjustable seat which can be moved within the hollow compartment for users of different stature.

Even still another object of the present invention is to provide a new simulated boat device that has turning mobility relating to a boat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
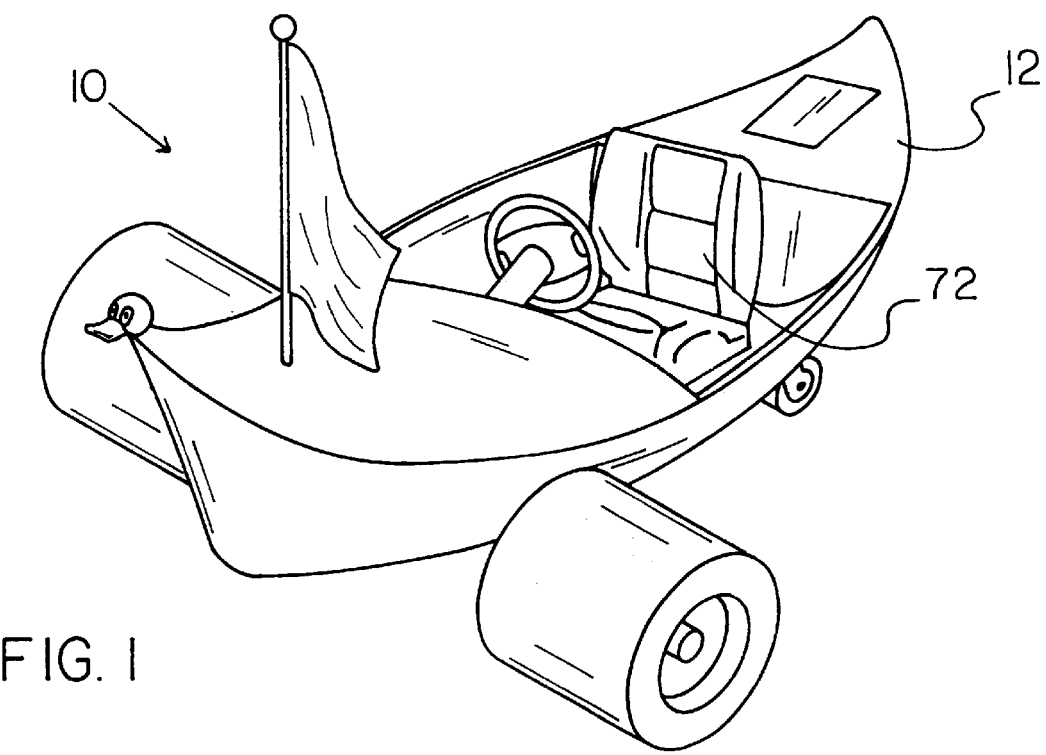
FIG. 1 is a schematic perspective view of a new simulated boat device according to the present invention.
Figure 2:
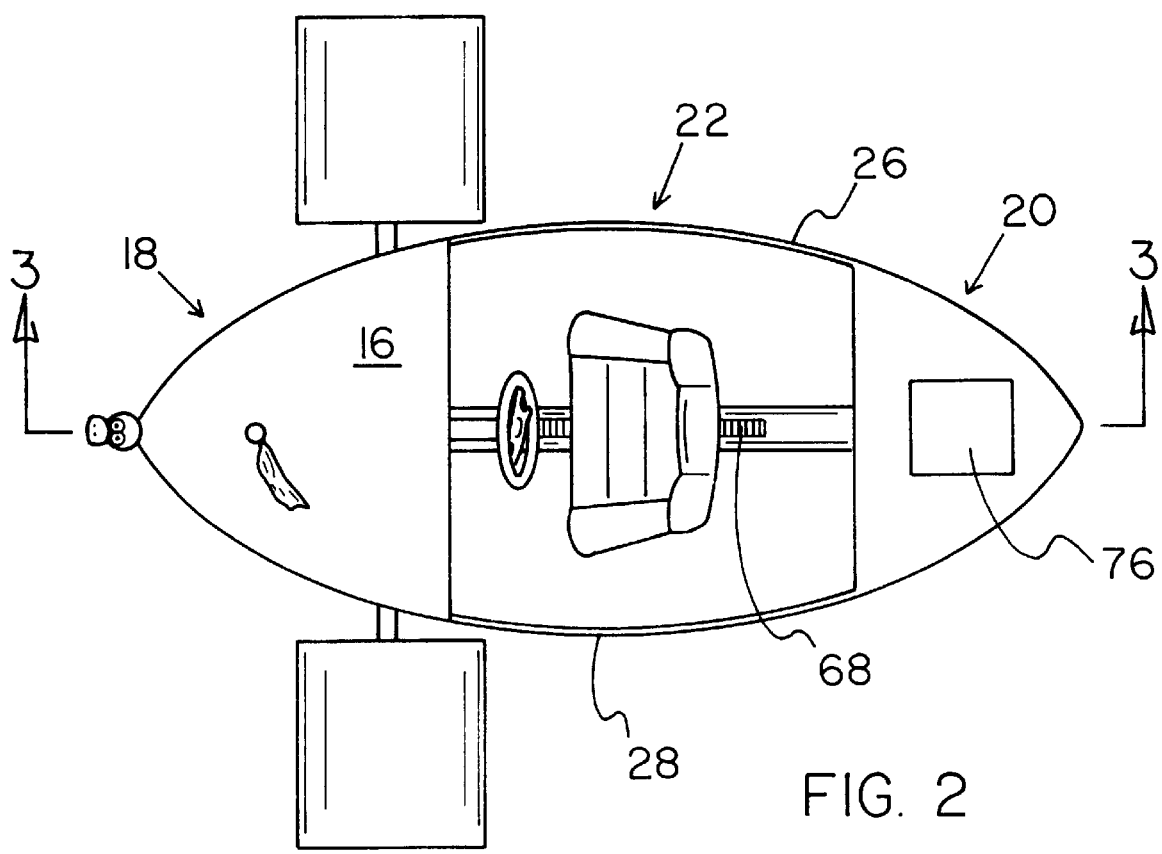
FIG. 2 is a schematic top view of the present invention.
Figure 3:
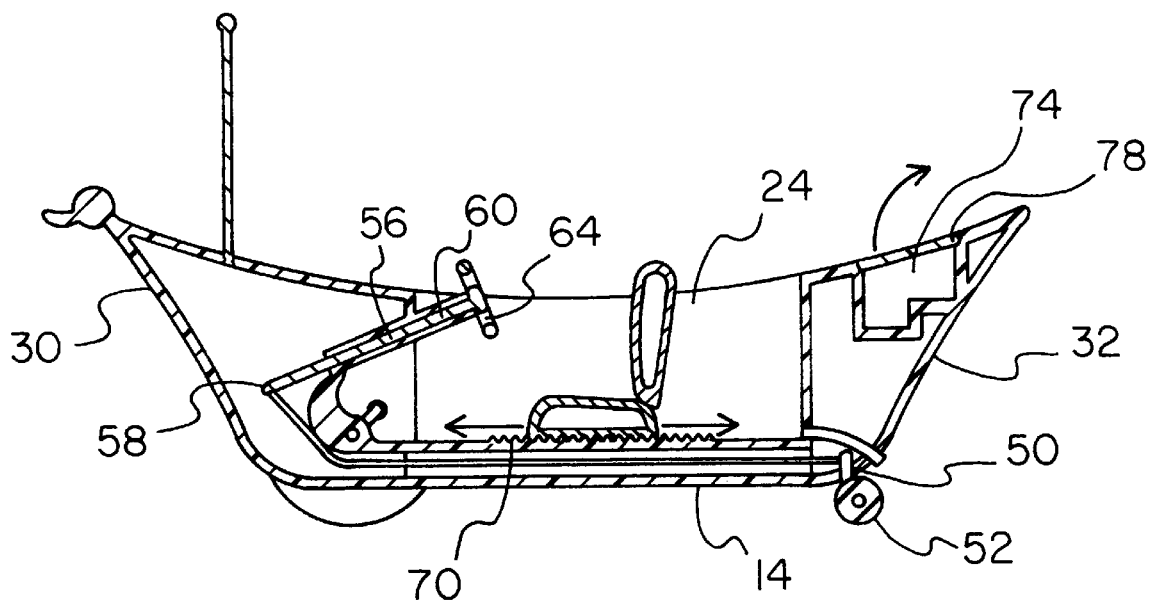
FIG. 3 is a schematic side cross-sectional view of the present invention.
Figure 4:
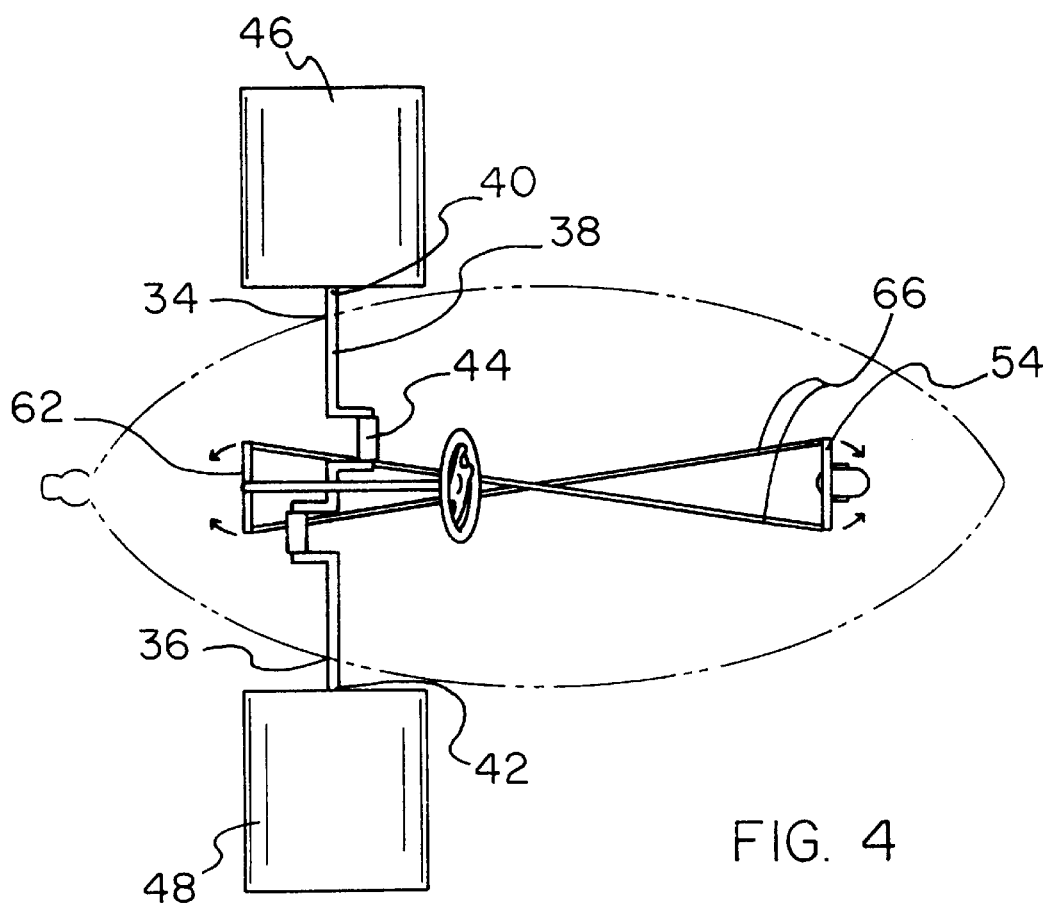
FIG. 4 is a schematic plan view of the present invention.

With reference now to the drawings, and in particular to FIGS. 1 through 4 thereof, a new simulated boat device embodying the principles and concepts of the present invention and generally designated by the reference numeral 10 will be described.

As best illustrated in FIGS. 1 through 4, the simulated boat device 10 generally comprises a hollow structure 12 forming the hull of the boat device. The hollow structure has a bottom wall 14, a top wall 16, a front portion 18, a back portion 20 and middle portion 22. The top wall has an opening 24 therein. Preferably, the opening 24 in the top wall 16 is in the middle portion 22 of the hollow structure 12. A first 26 and second side wall 28 extend between the top wall 16 and bottom wall 14. Each of the side walls has a first and second end. Each of the side walls 26, 28 is generally arcuate. The first end of the first side wall is coupled to the first end of the second side wall. The second end of the first side wall is coupled to the second end of the second side wall. The juncture of each of the first ends of the first and second side walls defines a front end 30 of the hollow structure. The juncture of each of the second ends of first and second side walls defines a back end of the hollow structure.

A first bore 34 is in the first wall 26 and is located generally in the front portion 18 of the hollow structure.

A second bore 36 is in the second wall 28 and is generally coaxial with the first bore 34.

An axle 38 extends through and is rotatably mounted in the first 34 and second 36 bores in the hollow structure. The axle 38 has a first end 40 and a second end 42 with a middle section between the first and second ends. Ideally, a peddling means on the middle section for permitting foot rotation of the axle. The peddling means consists of two pedals 44, wherein each of the pedals rotates about a longitudinal axis of the axle 38.

A first wheel 46 and a second wheel 48 are mounted to the axle. The first wheel 46 is fixedly coupled to the first end 40 of the axle 38, and the second wheel 48 is fixedly coupled to the second end 42 of the axle 38. The first and the second wheels have a diameter substantially equal to a height of the first and second walls.

An opening 50 is in the back portion 20 of the hollow structure 12.

Ideally, the device includes a steering assembly. The steering assembly comprises a steering column, a third wheel, a pair of cords and a first and second bar.

The third wheel 52 is rotatably mounted in the opening 50 in the bottom wall 14. The third wheel 52 is adapted to swivel, such that an axis of the third wheel 52 rotates with respect to the hollow structure 12.

The first bar 54 is mounted to the third wheel 52. The first bar 54 has a longitudinal axis generally oriented parallel to an axis of the third wheel 52.

The steering column 56 is for directing the direction of travel the third wheel 52. The steering column 56 is rotatably mounted in the front portion 18 of the hollow structure 12. The steering column 56 has a first end and 58 a second end 60. The second end 60 is directed toward the middle portion of the hollow structure. The second bar 62 is fixedly coupled to the first end 58 of the steering column.

The steering wheel 64 is fixedly mounted to the second end 60 of the steering column 56.

The pair of cords 66 couple the first end of the steering column to the third wheel. Each of the cords 66 is attached to the first 52 and second bars 62. One cord is attached to one end of the first bar and one end of the second bar. One cord is attached to the other end of the first bar and the other end of the second bar. Ideally, the cords cross each other midway between the first 52 and second bar 62. This configuration simulates the rudder of a boat when turning the device.

Preferably, a rail 68 is mounted within the hollow structure 12 on the bottom wall 14. The rail 68 is generally aligned with a line from the back end 32 to the front end 30 of the hollow structure. The rail has a plurality of detents 70 formed in an upper surface of the rail.

Ideally, a seat 72 is mounted on the rail 68 and is adapted to releasably engage the detents 70 on the rail.

Ideally, a chamber 74 is within the back portion 20 of the hollow structure 12. The chamber 74 is adjacent to the top wall 16 of the hollow structure 12. The chamber has a lid 76. The lid has four edges, and one of the edges of the lid is hingedly coupled to the top wall of the hollow structure by a hinge 78. Cargo may be stored in the chamber 74.

In use, the seat 72 is adjusted on the rail 68 so that the person using the device may reach the pedals 44. The user of the device turns the pedals 44 about the axis of the axle 38 with their feet. This rotates the first 46 and second wheels 48 to provide forward and rearward motion. The steering wheel 64 is coupled to the third wheel 52 via the steering assembly. The user of the device turns the steering wheel to change direction of the device. The third wheel 52 simulates a rudder on a boat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A simulated boat device, comprising:
    a hollow structure forming the hull of said boat device, said hollow structure having a bottom wall, a top wall, said hollow structure having a front portion, a back portion and middle portion, said top wall having an opening therein, said hollow structure having first and second opposing side walls;
    a first bore, said first bore being in said first wall, said first bore being located generally in said front portion of said hollow structure;
    a second bore, said second bore being in said second wall, said second bore being generally coaxial with said first bore;
    an axle, said axle extending through and being rotatably mounted in said first and second bores in said hollow structure, said axle having a first end and a second end with a middle section between said first and second ends;
    a first wheel and a second wheel, said first wheel being fixedly coupled to said first end of said axle, said second wheel being fixedly coupled to said second end of said axle;
    an opening in said bottom wall, said opening being in said back portion of said hollow structure; and
    a third wheel being rotatably mounted in said opening in said bottom wall, said third wheel being adapted to swivel, such that an axis of said third wheel rotates with respect to said hollow structure.

2. The simulated boat device as described in claim 1, comprising: wherein said opening said top wall is in said middle portion of said hollow structure.

3. The simulated boat device as described in claim 2, said axle further comprising:
    a peddling means on said middle section for permitting foot rotation of said axle, said peddling means being two pedals, wherein each of said pedals rotate about a longitudinal axis of said axle.

4. The simulated boat device as described in claim 1, wherein said side walls comprise:
    each of said side walls having a first and second end, each of said side walls being generally arcuate, said first end of said first side wall being coupled to said first end of said second side wall, said second end of said first side wall being coupled to said second end of said second side wall, a juncture of each of said first ends of said first and second side walls defining a front end of said hollow structure, a juncture of each of said second ends of first and second side walls defining a back end of said hollow structure.

5. The simulated boat device as described in claim 4, further comprising
    a rail, said rail being mounted within said hollow structure on said bottom wall, said rail being generally aligned with a line from said back end to said front end of said hollow structure, said rail having a plurality of detents formed in an upper surface of said rail;
    a seat, said seat being mounted on said rail, said seat being adapted to releasably engage said detents on said rail.

6. The simulated boat device as described in claim 5, further comprising:
    a chamber, said chamber being within said back portion of said hollow structure, said chamber being adjacent to said top wall of said hollow structure, said chamber having a lid thereon, said lid having four edges, one of said edges of said lid being hingedly coupled to said top wall of said hollow structure, wherein cargo may be stored in said chamber.

7. The simulated boat device as described in claim 1, further comprising:
    a steering assembly comprising a steering column, said third wheel, a pair of cords and a first and second bar;
    said first bar being mounted to said third wheel, said bar having a longitudinal axis being generally oriented parallel to an axis of said third wheel;
    wherein said steering column is for directing the direction of travel said third wheel, said steering column being rotatably mounted in said front portion of said hollow structure, said steering column having a first end and a second end, said second end being directed toward said middle portion of said hollow structure, said second bar being fixedly coupled to said first end of said steering column;
    said steering wheel being fixedly mounted to said second end of said steering column; and
    said pair of cords for coupling said first end of said steering column to said third wheel, each of said cords being attached to said first and second bars.

8. The simulated boat device as described in claim 1, further comprising
a steering column, said steering column being rotatably mounted in said front portion of said hollow structure, said steering column having a first end and a second end, said second end being directed toward said middle portion of said hollow structure; and
said steering wheel being fixedly mounted to said second end of said steering column.

9. A simulated boat device, comprising:
a hollow structure forming the hull of said boat device, said hollow structure having a bottom wall, a top wall, said hollow structure having a front portion, a back portion and middle portion, said top wall having an opening therein, said opening in said top wall being in said middle portion of said hollow structure, a first and second side wall extend between said top wall and said bottom wall, each of said side walls having a first and second end, each of said side walls being generally arcuate, said first end of said first side wall being coupled to said first end of said second side wall, said second end of said first side wall being coupled to said second end of said second side wall, a juncture of each of said first ends of said first and second side walls defining a front end of said hollow structure, a juncture of each of said second ends of first and second side walls defining a back end of said hollow structure;
a first bore, said first bore being in said first wall, said first bore being located generally in said front portion of said hollow structure;
a second bore, said second bore being in said second wall, said second bore being generally coaxial with said first bore;
an axle, said axle extending through and being rotatably mounted in said first and second bores in said hollow structure, said axle having a first end and a second end with a middle section between said first and second ends, a peddling means on said middle section for permitting foot rotation of said axle, said peddling means being two pedals, wherein each of said pedals rotate about a longitudinal axis of said axle;
a first wheel and a second wheel, said first wheel being fixedly coupled to said first end of said axle, said second wheel being fixedly coupled to said second end of said axle, said first and said second wheels having a diameter substantially equal to a height of said first and second walls;
an opening in said bottom wall, said opening being in said back portion of said hollow structure;
a steering assembly comprising a steering column, a third wheel, a pair of cords and a first and second bar;
said third wheel being rotatably mounted in said opening in said bottom wall, said third wheel being adapted to swivel, such that an axis of said third wheel rotates with respect to said hollow structure, said first bar being mounted to said third wheel, said bar having a longitudinal axis being generally oriented parallel to an axis of said third wheel;
wherein said steering column is for directing the direction of travel said third wheel, said steering column being rotatably mounted in said front portion of said hollow structure, said steering column having a first end and a second end, said second end being directed toward said middle portion of said hollow structure, said second bar being fixedly coupled to said first end of said steering column;
said steering wheel being fixedly mounted to said second end of said steering column;
said pair of cords for coupling said first end of said steering column to said third wheel, each of said cords being attached to said first and second bars;
a rail, said rail being mounted within said hollow structure on said bottom wall, said rail being generally aligned with a line from said back end to said front end of said hollow structure, said rail having a plurality of detents formed in an upper surface of said rail;
a seat, said seat being mounted on said rail, said seat being adapted to releasably engage said detents on said rail; and
a chamber, said chamber being within said back portion of said hollow structure, said chamber being adjacent to said top wall of said hollow structure, said chamber having a lid thereon, said lid having four edges, one of said edges of said lid being hingedly coupled to said top wall of said hollow structure, wherein cargo may be stored in said chamber.

* * * * *